Nov. 11, 1930.   C. P. CIRAC   1,780,907
REVERSE LOCK MECHANISM
Filed Feb. 20, 1925
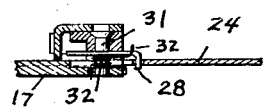
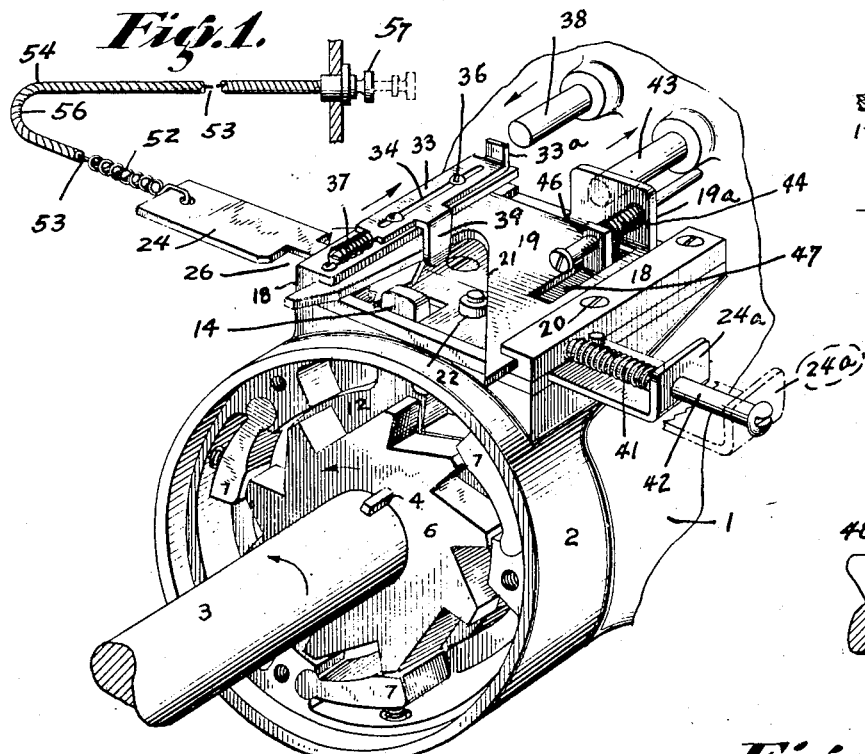
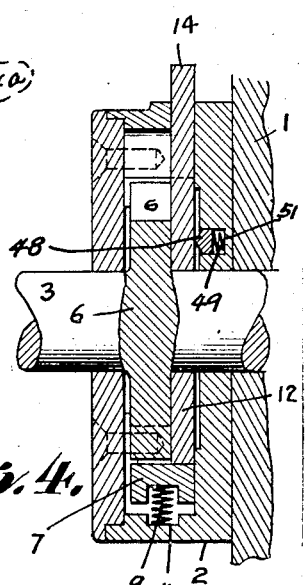
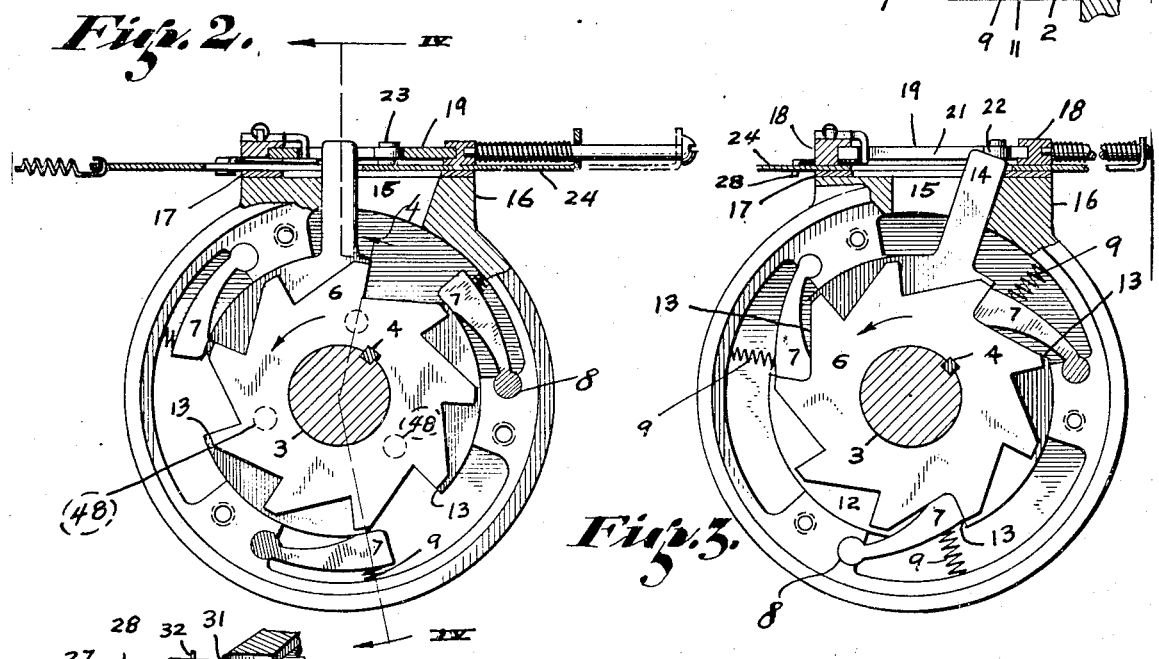
INVENTOR
Charles Paul Cirac
BY
Bradley L. Benson
ATTORNEY Patented Nov. 11, 1930

1,780,907

UNITED STATES PATENT OFFICE

CHARLES PAUL CIRAC, OF SAN FRANCISCO, CALIFORNIA

REVERSE LOCK MECHANISM

Application filed February 20, 1925. Serial No. 10,465.

The present invention is an improved reverse lock mechanism and relates to a lock for preventing a vehicle from running backward, and to means, responsive to conventional gear shift means for selectively rendering said lock operative or inoperative.

Provision is made whereby said lock will be actuated automatically with a shift of gears to the position made necessary by each change.

The objects of this invention include:

(1) The provision of reverse lock mechanism which, when attached to a conventional transmission housing of an automobile, will be responsive to the movement of the selector rods of the gear shift mechanism without mechanical connection therewith or alteration thereof.

(2) The provision of a dash control for said lock whereby the plate controlling the lock may be placed under tension for subsequent automatic reaction in response to any forward movement of the car.

In the accompanying drawings:

Figure 1 is a perspective view showing a fragment of a transmission housing with my invention connected thereto and the cover plate removed for better illustration, Figure 2 is an end view of my device with the cover removed and showing the reverse lock in inoperative position, Figure 3 is a view similar to Figure 2, but showing the reverse lock in operative position, Figure 4 is a section of Figure 2 taken on the irregular line IV—IV, Figure 5, is a sectional view of a latch detail, and Figure 6, is a perspective view of a spring pressed latch member.

Referring to the drawings the numeral 1 indicates the housing of the transmission and gear set of an automobile to which is secured, by any suitable means, a cylindrical box 2 through which extends the drive shaft 3 of said transmission. The wall of box 2 adjacent the transmission housing serves as a base plate or fixed member for retaining pawls which engage a locking plate secured to a moving part. Keyed, as shown at 4 to said shaft is a ratchet wheel 6 the teeth of which engage, at times, pawls 7. The pawls 7 are provided with circular heads which seat in sockets 8 in the box 2. Each of pawls 7 is urged into engagement with the notches between the teeth in wheel 6 by springs 9, which bear at one end against said pawl and at the other end seat in bores 11 in the box 2.

Freely rotatable on shaft 3 is a control plate 12 provided with notches 13 corresponding in number, with the pawls 7 and in shape with the notches in ratchet wheel 6.

It will be seen that if the plate 12 be rotated on shaft 3 to the position shown in Figure 2 the oblique surfaces of notches 13 will raise the pawls 7 to their retracted position, the said pawls being equal in thickness to that of both the ratchet wheel 6 and control plate 12, as shown in Figure 4.

When said plate 12 is rotated, clockwise, to the position shown in Figure 3, the notches 13 permit the pawls 7 to extend, under urge of springs 9 and lock shaft 3 against further rotation. In order to provide an extraneous means for rotating plate 12 as described, I provide a finger 14 integral with said plate which extends through a slot 15 in a boss 16 on box 2. Said slot limits the travel of said finger 14.

At 17 I show a plate secured to the top of boss 16 and at 18 channeled members secured by screws 20 to said boss. Slidable in the channels of members 18 is a cam plate 19 provided with an oblique cam surface 21. The purpose of this cam 21 is to engage a roller 22 on a pin 23 secured to a slide 24 and thereby impart a movement to said slide in a direction transverse to that of plate 19.

The slide 24 is provided with a notch 26 adapted to engage and actuate finger 14 of the control plate 12.

Said slide 24 is also provided with a notch 27 for engagement with a detent or finger 28 on a latch member 29 pivoted on a screw 31 secured to plate 17. A spring 32 is coiled around screw 31 and one end thereof is bent to urge finger 28 into notch 27 and the other end thereof is bent to bear against plate 17.

The latch 29 is an elbow form. One arm 29ª of said latch overlies the slide 24 and extends into the path of travel of finger 14 as shown in Figure 1. In order to provide a means for releasing latch 29 or rather, finger 28 thereof, from the slide 24 I provide a slotted plate 33, Figure 1, which has a slot 34, through which extend screws 36 threaded into channel member 18.

Said plate 33 is normally urged to the position shown in Figure 1 by a spring 37. However, when said spring 37 is compressed by the thrust of a selector rod 38 engaging an upturned end 33$^a$ of said plate, the entire plate is moved longitudinally and a bent-down finger 39 thereof engages arm 29$^a$ and releases finger 28 from notch 27 in slide 24. When so released the slide 24 is urged to the dotted line position Figure 1 by a spring 41 surrounding a bolt 42, the head of which serves as a stop for the upturned end 24$^a$ of said slide.

The cam plate 19 is provided with an upturned end 19$^a$ for engagement by a selector rod 43 of the gear set when same is shifted to reverse position at which time the parts will assume the position shown in Figure 1.

In this position the reverse lock (ratchet wheel 6 and pawls 7) are disengaged and the shaft 3 can be rotated in either direction by power or by coasting the vehicle.

When the selector rod 43 is moved to neutral position (in the opposite direction) plate 19 is caused to follow by a spring 44 which bears at one end against the upturned end 19$^a$ and at the opposite end against a stud 46 secured to plate 17 and extending through a slot 47 in plate 19.

This leaves slide 24 free to return to the dotted line position except for the engagement of finger 28 of latch 29 which still engages notch 27 until disengaged by finger 39 or by a forward movement of the vehicle.

In order to cause any forward movement of the vehicle to render the reverse lock operative automatically irrespective of power applied thereto I provide sharp pointed studs 48, Figure 4, which are urged against the back of control plate 12 by springs 49 seated in recesses 51 in box 2.

The frictional engagement thus afforded between said control plate and the ratchet wheel 6, keyed to shaft 3, causes the rotation of said shaft to impart its movement to said control plate which rotates therewith and causes finger 14 to actuate latch 29, releasing finger 28 from notch 27. The same frictional engagement in a reverse direction will cause the control plate to move to a position in which the pawls 7 become effective.

*Operation*

In ordinary driving the parts assume the position shown in Figure 2, with the exception that the slide 24 would be in the position shown in Figure 3. Pawls 7 are prevented from clicking over the teeth of ratchet wheel 6 by the position of control plate 12. However, any rearward movement of the vehicle, whether in response to power or to gravity, will move said plate 12 (because of the frictional engagement between said plate and said ratchet) to the position shown in Figure 3 and the pawls 7 will immediately check further reverse movement.

When it is desired to reverse the vehicle a shift of gears to reverse, automatically renders the reverse lock inoperative by the abutment of selector rod 43 against finger 19$^a$ which moves slide 24 until locked by finger 28 of the latch. This locks finger 14 securely in the position shown in Figure 1 and reversal of shaft 3 is possible.

It is sometimes desirable to render the reverse lock permanently inoperative, as in a garage. Accordingly, I provide a dash control for manual manipulation of slide 24. At 52 I show a spring secured at one end to slide 24 and at the other end to a cable 53 slidable in an armored conduit 54 provided intermediate its length with a return bend 56. The end of cable 53 remote from spring 52 is connected to a pull button 57 provided with a friction detent adapted to yieldably hold it in the extended position indicated in dotted lines until the button is again returned by finger pressure.

The spring 52 affords a yieldable element which permits the pulling of the dash button in case the reverse lock is held by the engagement of pawls 7 and ratchet wheel 6.

After the button 57 is pulled out and tension is on spring 52 the slightest forward movement of the vehicle will disengage said pawls 7 from ratchet 6 whereupon the urge of spring 52 will move slide 24 to its latched position.

I claim:

1. In a device of the character described the combination of a baseplate, a ratchet wheel, stop means for locking the ratchet wheel against movement in one direction relatively to the baseplate, a control plate controlling said stop means, and means for causing frictional engagement between said ratchet wheel and said control plate, whereby to engage the stop means when the ratchet wheel is moved in one direction, and to disengage the stop means when the ratchet wheel is moved in the other direction, and manually actuable means for placing said control plate under urge to disengage said stop means.

2. In a device of the character described, the combination of a baseplate, a ratchet wheel, stop means for locking the ratchet wheel against movement in one direction relatively to the baseplate, a control plate governing said stop means, and means for causing frictional engagement between said ratchet wheel and said control plate, whereby to engage the stop means when the ratchet wheel is moved in one direction and to disengage the stop means when the ratchet wheel is moved in the other direction, means, responsive to thrust of a gear shift mechanism for restraining said control plate from movement in one direction, latch means engaging said control plate when in a position to render said stop means inoperative, and means, responsive to a thrust of a gear shift mechanism, for releasing said latch means.

3. In a device of the character described, the combination of a baseplate, a ratchet wheel, stop means for locking the ratchet wheel against movement in one direction relatively to the baseplate, a control plate governing said stop means, and means for causing frictional engagement between said ratchet wheel and said control plate, whereby to engage the stop means when the ratchet wheel is moved in one direction and to disengage the stop means when the ratchet wheel is moved in the other direction, means, responsive to thrust of a gear shift mechanism for restraining said control plate from movement in one direction, latch means engaging said control plate when in a position to render said stop means inoperative, and means, responsive to a thrust of a gear shift mechanism to a forward position, for releasing said latch means.

4. In a device of the character described, the combination of a baseplate, a ratchet wheel, stop means for locking the ratchet wheel against movement in one direction relatively to the baseplate, a control plate governing said stop means, and means for causing frictional engagement between said ratchet wheel and said control plate, whereby to engage the stop means when the ratchet wheel is moved in one direction and to disengage the stop means when the ratchet wheel is moved in the other direction, means, responsive to thrust of a gear shift mechanism for restraining said control plate from movement in one direction, latch means for engaging said control plate when in a position to render said stop means inoperative, and means, responsive to movement of a gear shift mechanism to reverse position, for moving said control plate to a position in which it renders said stop means inoperative.

5. A reverse lock mechanism for automobiles comprising rotating means carried by a shaft, ratchet teeth upon the periphery of said rotating means, stop means carried by a fixed member normally urged toward said ratchet teeth upon said rotating means to prevent rotation thereof, a control plate having ratchet teeth thereon also cooperating with said stop means to render the same operative or inoperative and means operable upon movement of said shaft to operate said control plate to cause said ratchet teeth to lock or unlock said lock mechanism.

In testimony whereof I affix my signature.

CHARLES PAUL CIRAC.